Aug. 31, 1965  J. A. WEGENER  3,203,307
OPTICAL INSTRUMENT
Filed Jan. 24, 1962

INVENTOR.
JOHN A. WEGENER
BY
ATTORNEYS

3,203,307
OPTICAL INSTRUMENT
John A. Wegener, 830 Chambers Ave.,
Gloucester City, N.J.
Filed Jan. 24, 1962, Ser. No. 168,383
3 Claims. (Cl. 88—1)

This application relates to optical instruments and, more particularly, to a viewing instrument for visualizing the effect of predetermined reduction in size of copy, comprising a reduction lens and a transparent calibration chart by means of which the proper distance between the lens and the viewed object, for a particular reduction, may be readily determined without reference to or the setting of a mechanical measuring device.

Reduction viewing instruments have a wide range of utility in such fields as printing and advertising wherein the printer or the advertising salesman often wishes to demonstrate how the printed page or advertisement will appear when it is reduced to the size in which it will be shown in a reproduction. When employed in this type of work, previously known reduction viewing instruments require the printer or salesman to carry some type of calibrated stand or mechanical device so that the viewing lens can be positioned properly with respect to the object being viewed. Such mechanical devices are bulky to carry and awkward to use in addition to requiring an inordinate amount of time to mechanically adjust and readjust whenever it is desired to change the percent of reduction at which the object is being viewed.

The present invention eliminates the necessity of a mechanical measuring device and also eliminates the need for mechanical readjustment when it is desired to change the percent of reduction at which the object is being viewed.

Therefore, one object of the present invention is to provide a reduction viewing instrument which is exceptionally portable in that it does not require a calibrated stand or any other type of mechanical measuring device.

A further object of the present invention is to provide a reduction viewing instrument which may be visually adjusted to achieve any desired percentage of reduction.

Yet another object of the present invention is to provide a viewing instrument wherein the proper distance between the lens and the object may be determined by reference to a calibrated chart positioned within the field of vision of the lens.

Figure 1:
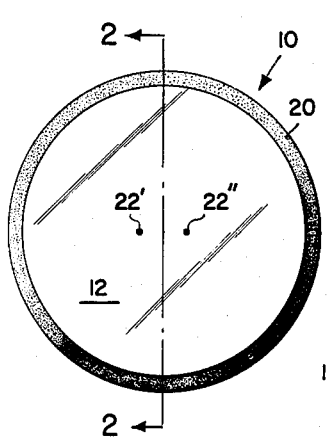
Figure 2:
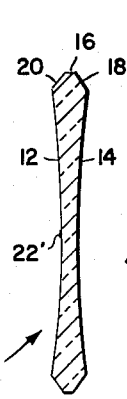
Figure 3:
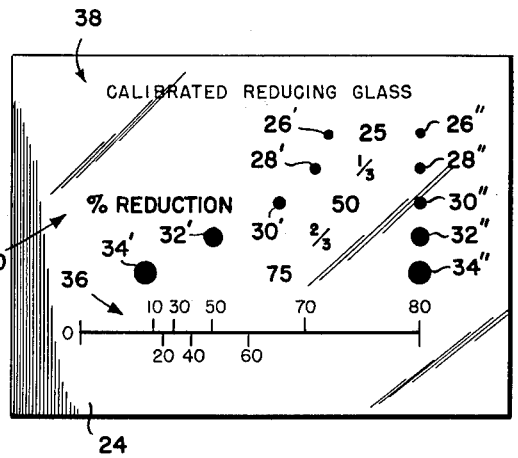
Figure 4:
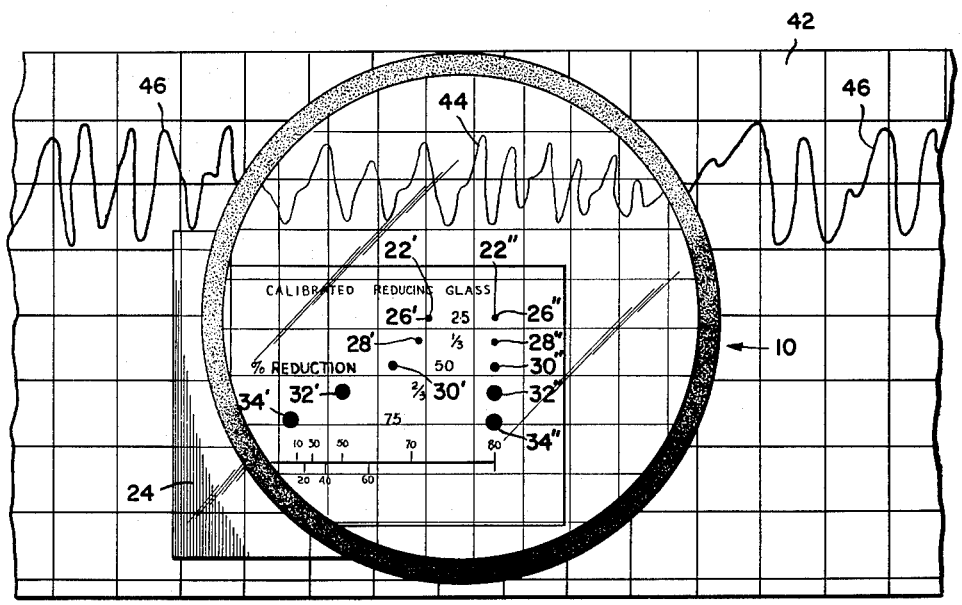

The attainment of the foregoing and other objects of the invention, and particularly those relating to the details of construction and operation, will become more fully apparent from the following description when read in conjunction with the accompanying drawing, in which:

FIGURE 1 is an elevation of the reduction lens;
FIGURE 2 is a sectional view of the lens taken along line 2—2 of FIGURE 1;
FIGURE 3 is an elevational view of one form of transparent calibration chart; and
FIGURE 4 is a plan view of the lens and calibration chart as they appear to the eye of the viewer when positioned for viewing a graph at a 25 percent reduction in size.

In the illustrated embodiment of the invention, negative or diverging lens 10, of glass or transparent plastic, is shown to be of the double concave type; however, it is to be understood that lens 10 may also be formed as a convexo-concave or a plano-concave lens since each of these three types of lenses will produce a reduced image of the object being viewed. Of course, it will be understood that the size of the image varies inversely with respect to the distance between the lens and the viewed object so that, as the lens is moved away from the object, the image thereof decreases in size. As more commonly expressed in the printing and advertising art, the percent of reduction increases as the distance between the lens and the object increases.

Reference is now made to FIGURES 1 and 2 wherein lens 10 is shown to include concave surfaces 12 and 14, circumferential edge 16 and beveled edges 18 and 20, the latter of which provide a convenient area for holding the lens such that the user's fingers do not obstruct the field of vision provided by concave surfaces 12 and 14. A pair of reference dots 22'–22", the purpose of which will be hereinafter set forth, are printed on or otherwise secured to lens 10 within the above-mentioned field of vision. It will be understood that lens 10 may be composed of any transparent material such as glass or plastic having optical properties which meet the requirements imposed by the intended use. That is, the lens may be formed of molded plastic if it is to be employed to view relatively large objects such as in layout design work, whereas, the lens would be composed of glass or plastic if it is to be employed to view fine lines in drafting or small lines of print covering relatviely small areas.

Referring now to FIGURE 3, calibration chart 24 is composed of a sheet of transparent material such as glass of plastic having a plurality of pairs of dots 26'–26", 28'–28", 30'–30", 32'–32", and 34'–34", the dots of each pair being of increasing size and being spaced apart by increasing distances. Between each pair of dots, chart 24 is provided with numerals "25", "50", "75", and fractions "⅓" and "⅔" which refer to the various percentages of reduction in size which may be achieved during the operation of the invention. Chart 24 is also provided with a scale 36 bearing numerals "0" through "80" which also refer to the various percentages of reduction. Finally, it will be noted that chart 24 bears a first legend 38 indicating its function and a second legend 40 indicating that the instrument is to be read in terms of reduction percentages, thereby eliminating the possibility of erroneous readings.

The operation of the invention will now be described with reference to FIGURE 4. For purposes of illustration, it may be assumed that a manufacturer of an electrocardiograph machine wishes to illustrate the electrocardiograph produced by the machine in an advertisement wherein the clarity of the reproduced electrocardiograph will obviously vary with the amount of reduction. Hence, the advertising salesman wishes to demonstrate that 25 percent of reduction will be possible without destroying the clarity of the sharp and irregular peaks of the tracing line. To accomplish this, chart 24 is placed over the central portion of electrocardiograph 42 and both chart 24 and electrocardiograph 42 are then viewed through lens 10 which is held in the user's hand. Since it is desired to view electrocardiograph 42 at a 25 percent reduction in size, lens 10 is positioned over chart 24 and variably spaced therefrom by the observer, such that dots 22'–22" appear immediately adjacent or over dots 26'–26", respectively, the lens 10 being moved towards or away from the chart to secure this end. When this coincidence is achieved, the viewed image 44 of tracing line 46 through the lens is a 25 percent reduction of the actual size of tracing line 46. Thus, the invention enables one to view an object at any desired percent of reduction by merely aligning dots 22'–22" with the appropriate dots provided on chart 24. Alternatively, dots 22'–22" may be aligned with the desired markings along scale 36, dot 22' being aligned with the zero marking and dot 22" being aligned with the desired reduction marking on the scale.

It is to be understood that the illustrated form of the invention in no way limits the invention to the use of dots but, rather, a scale or other predetermined markings such as a set of cross hairs may be provided on lens 10 to perform the same function as that of dots 22'–22". Similarly, it will be obvious that the pairs of dots 26 through 34 may be eliminated and sole reliance placed on graduate scale 36. Such scale or other markings may be provided on an opaque member, provided however, that said member does not obscure too much of the matter being viewed.

It will be evident that the markings 22' and 22" may be imprinted on a transparent sheet separate from the lens but secured thereto closely adjacent to it.

Since numerous other modifications and alterations will readily appear to one skilled in the art, the invention is understood to be in no way limited other than as set forth hereinafter in the appended claims.

What is claimed is:

1. For use by a person desiring to visualize the appearance of an object to be reproduced in a reduced size, the combination comprising:

a negative lens through which the object may be viewed;

means providing at least one first pair of spaced markings closely adjacent to a surface of said lens substantially in a plane normal to its optical axis and within its field of vision;

and means providing at least one second pair of spaced markings adapted to be superimposed on said object closely adjacent thereto to be viewed with the object through said lens and adapted to be brought into visual coincidence with said first markings by displacement of said lens towards and from said object;

the markings of said second pair being spaced from each other by a distance greater than the spacing of the markings of the first pair, the spacings of the markings of the respective pairs having a predetermined relationship determinative of the apparent reduction.

2. The combination of claim 1 in which the means providing the first pair of spaced markings comprises markings on a surface of the lens.

3. The combination of claim 1 in which the means providing the second pair of spaced markings comprises a transparent sheet carrying said markings.

References Cited by the Examiner

UNITED STATES PATENTS

| | | | |
|---|---|---|---|
| 547,243 | 10/95 | Colvin | 88—32 |
| 2,413,198 | 12/46 | Stewart | 33—174 |
| 2,497,360 | 2/50 | Justice | 88—1 |
| 2,588,035 | 3/52 | O'Neil | 88—1 |

JEWELL H. PEDERSEN, *Primary Examiner.*

EMIL G. ANDERSON, *Examiner.*